US009079560B2

(12) United States Patent
Gautama et al.

(10) Patent No.: US 9,079,560 B2
(45) Date of Patent: Jul. 14, 2015

(54) DEVICE LOCATION DETERMINATION BY A VEHICLE

(71) Applicant: GM Global Technology Operations LLC, Detroit, MI (US)

(72) Inventors: Neeraj R. Gautama, Whitby (CA); Amanda J. Kalhous, Ajax (CA); Cem U. Saraydar, Birmingham, MI (US)

(73) Assignee: GM Global Technology Operations LLC, Detroit, MI (US)

(*) Notice: Subject to any disclaimer, the term of this patent is extended or adjusted under 35 U.S.C. 154(b) by 244 days.

(21) Appl. No.: 13/667,387

(22) Filed: Nov. 2, 2012

(65) Prior Publication Data

US 2014/0129051 A1 May 8, 2014

(51) Int. Cl.
| H01Q 1/32 | (2006.01) |
| B60R 25/24 | (2013.01) |
| H04W 4/02 | (2009.01) |
| H04W 4/04 | (2009.01) |
| G01S 13/87 | (2006.01) |
| G01S 11/06 | (2006.01) |
| G01C 17/38 | (2006.01) |
| H04W 64/00 | (2009.01) |
| G01S 13/46 | (2006.01) |

(52) U.S. Cl.
CPC ............ B60R 25/245 (2013.01); G01S 13/878 (2013.01); H04W 4/028 (2013.01); H04W 4/046 (2013.01); G01C 17/38 (2013.01); G01S 11/06 (2013.01); *G01S 2013/466* (2013.01); *H04W 64/006* (2013.01)

(58) Field of Classification Search
None
See application file for complete search history.

(56) References Cited

U.S. PATENT DOCUMENTS

| 6,236,333 | B1* | 5/2001 | King ........................ 340/5.61 |
| 6,906,612 | B2* | 6/2005 | Ghabra et al. ............. 340/5.61 |
| 8,319,605 | B2* | 11/2012 | Hassan et al. ............. 340/5.72 |
| 2011/0148573 | A1* | 6/2011 | Ghabra et al. ............. 340/5.61 |

FOREIGN PATENT DOCUMENTS

DE 102010062092 A1 6/2011

OTHER PUBLICATIONS

German Office Action for German Application No. 10 2013 221 936.9, Mailed Apr. 23, 2014, 7 pages.

* cited by examiner

Primary Examiner — Redhwan K Mawari
Assistant Examiner — Edward Torchinsky
(74) Attorney, Agent, or Firm — Cantor Colburn LLP

(57) ABSTRACT

A device location determination includes authenticating a device within range of a vehicle via a node in a vehicle. The vehicle includes a first peripheral device and a second peripheral device that is disposed at a location on the vehicle that is different than the first peripheral device. The peripheral devices are coupled to an antenna of the node. The device location determination also includes receiving from the device a first signal strength value associated with a first signal of the first peripheral device, a second signal strength value associated with a second signal of the second peripheral device, and a third signal strength value associated with a third signal transmitted by the node. The device location determination also includes determining a location of the device from the signal strength values and performing a remote function with respect to the vehicle.

20 Claims, 2 Drawing Sheets

DEVICE LOCATION DETERMINATION BY A VEHICLE

FIELD OF THE INVENTION

The subject invention relates to location determination of a user interface device and, more particularly, to location and direction determination of a user interface device by a vehicle for providing passive entry passive start functions and remote keyless entry functions.

BACKGROUND

Vehicles equipped with automotive remote functionality typically operate through wireless communication between a key fob and a vehicle. Passive entry passive start (PEPS) functions and/or remote keyless entry (RKE) functions are examples of automotive remote functionality.

A vehicle enabled for RKE operates to perform various vehicle functions (e.g., remote engine start, trunk release, door locking and unlocking functions, activating and deactivating vehicle lights, etc.) when an operator of the vehicle presses a button on the key fob. A vehicle equipped for PEPS functions, by contrast, is typically transparent to the operator. When the vehicle identifies a signal from the key fob within its proximity and the operator attempts to the open the vehicle door, the vehicle unlocks the door and the user may start the vehicle by simply pressing a button.

What is needed is a way to determine the location and direction of movement of a device, such as a key fob, in order to determine and implement a corresponding PEPS and/or RKE function.

SUMMARY OF THE INVENTION

In one exemplary embodiment of the invention, a system is provided. The system includes a node embedded in a vehicle. The node includes a computer processor and an antenna. The system also includes a first peripheral device disposed at a first location on the vehicle and a second peripheral device disposed at a second location on the vehicle that is different than the first location. The first peripheral device and the second peripheral device are communicatively coupled to the node, and each of the first peripheral device and the second peripheral device includes an antenna. The system further includes an application executable by the computer processor. The application is configured to implement a method. The method includes authenticating a device within wireless communicative range of the vehicle and receiving, from the device, a first signal strength indicator value associated with a first signal transmitted by the first peripheral device, a second signal strength indicator value associated with a second signal transmitted by the second peripheral device, and a third signal strength indicator value associated with a third signal transmitted by the antenna of the node. Each of the first, second, and third signal strength indicator values indicates a strength of the respective first, second, and third signals. The method also includes determining a location of the device from the first, second, and third signal strength indicator values using a triangulation algorithm and performing a remote function with respect to the vehicle upon determining that results of the triangulation algorithm meet a threshold value.

In another exemplary embodiment of the invention, a method is provided. The method includes authenticating, via a computer processor of a node embedded in a vehicle, a device within wireless communicative range of the vehicle. The vehicle includes a first peripheral device disposed at a first location on the vehicle and a second peripheral device disposed at a second location on the vehicle that is different than the first location. The first peripheral device and the second peripheral device are communicatively coupled to an antenna of the node. The method also includes receiving, from the device via an application executable by the computer processor, a first signal strength indicator value associated with a first signal transmitted by the first peripheral device, a second signal strength indicator value associated with a second signal transmitted by the second peripheral device, and a third signal strength indicator value associated with a third signal transmitted by the antenna of the node. The first, second, and third signal strength indicator values indicate a strength of respective first, second, and third signals. The method also includes determining a location of the device from the first, second, and third signal strength indicator values using a triangulation algorithm and performing a remote function with respect to the vehicle upon determining that results of the triangulation algorithm meet a threshold value.

In a further exemplary embodiment of the invention, a computer program product is provided. The computer program product includes a computer-readable storage medium having instructions embodied thereon, which when executed by a computer processor embedded in a vehicle, causes the computer processor to implement a method. The method includes authenticating a device within wireless communicative range of the vehicle. The vehicle includes a first peripheral device disposed at a first location on the vehicle and a second peripheral device disposed at a second location on the vehicle that is different than the first location. The first peripheral device and the second peripheral device are communicatively coupled to an antenna of a node in the vehicle. The method also includes receiving, from the device, a first signal strength indicator value associated with a first signal transmitted by the first peripheral device, a second signal strength indicator value associated with a second signal transmitted by the second peripheral device, and a third signal strength indicator value associated with a third signal transmitted by the antenna of the node. The first, second, and third signal strength indicator values indicate a strength of respective first, second, and third signals. The method further includes determining a location of the device from the first, second, and third signal strength indicator values using a triangulation algorithm and performing a remote function with respect to the vehicle upon determining that results of the triangulation algorithm meet a threshold value.

The above features and advantages and other features and advantages of the invention are readily apparent from the following detailed description of the invention when taken in connection with the accompanying drawings.

BRIEF DESCRIPTION OF THE DRAWINGS

Other features, advantages and details appear, by way of example only, in the following detailed description of embodiments, the detailed description referring to the drawings in which.

DESCRIPTION OF THE EMBODIMENTS

The following description is merely exemplary in nature and is not intended to limit the present disclosure, its application or uses.

In accordance with an exemplary embodiment of the invention, device location and direction of movement determinations by a vehicle for implementing remove vehicle functions are provided. The remote vehicle functions may include passive entry passive start (PEPS) functions and/or remote keyless entry (RKE) functions. In an exemplary embodiment, the vehicle includes components that are used to collectively determine a location and direction of a user interface device (UID). Information collected from the components is processed, e.g., using a triangulation algorithm, and the results of the algorithm are used to determine an appropriate remote function (e.g., PEPS or RKE). These and other features of the invention will now be described.

Figure 1:
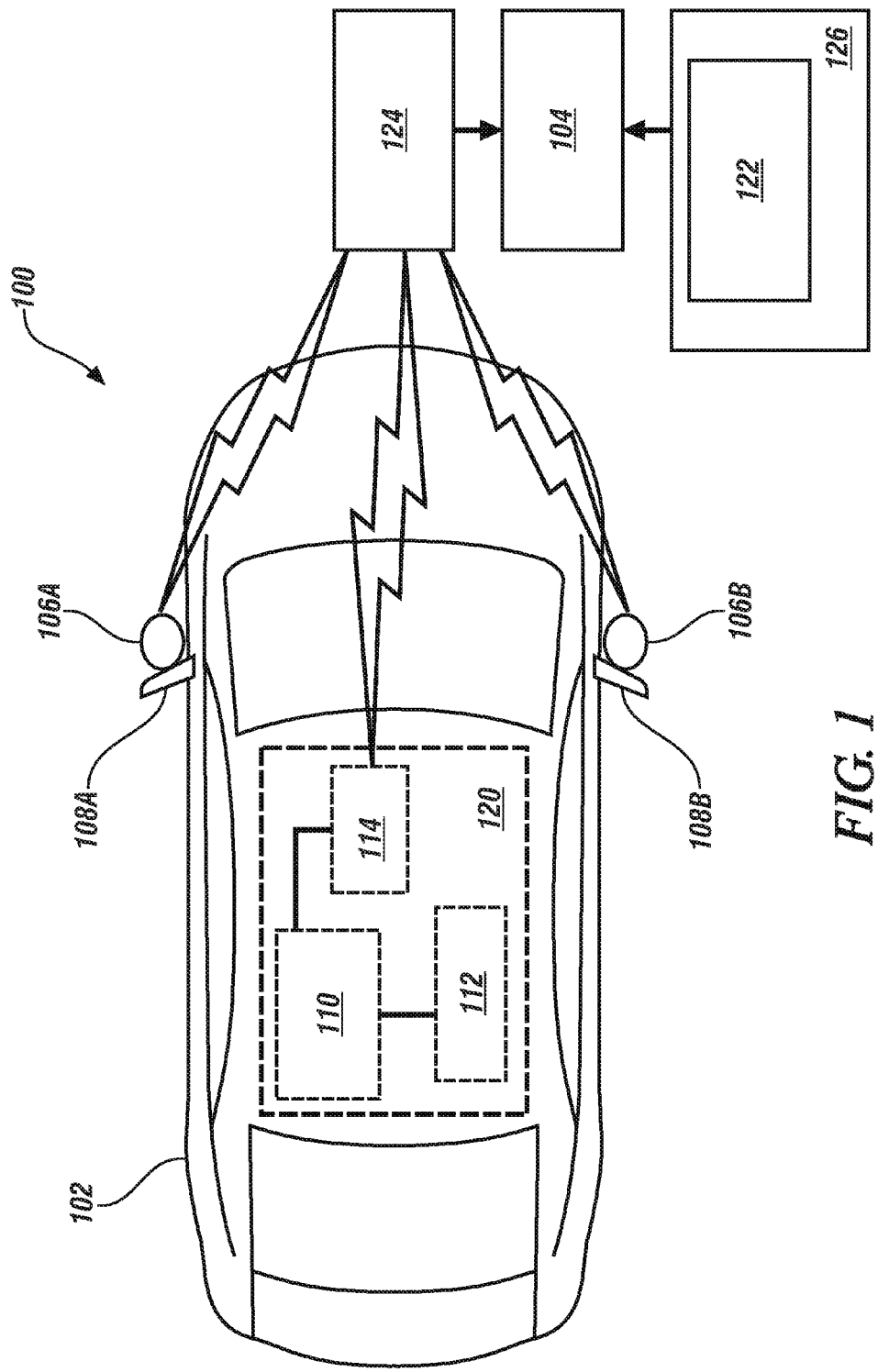
FIG. 1 is a schematic drawing of an exemplary system for determining a location and direction of movement of a device by a vehicle.

Turning now to FIG. 1, a system 100 for determining a location of a user interface device (UID) 104 by a vehicle 102 is provided. The system 100 includes the vehicle 102 and the UID (also referred to herein as "device") 104.

The vehicle 102 may be any vehicle known in the art. The vehicle 102 includes a first peripheral device 106A and a second peripheral device 106B that are disposed on the vehicle 102. In an embodiment, the peripheral devices 106A and 106B include antennae configured to communicate using wireless low-energy communication protocols, such as Bluetooth® low energy. It will be understood that any wireless communication protocols having peer-to-peer networking capabilities may be employed by the peripheral devices 106A and 106B in order to realize the advantages of the embodiments described herein. In an embodiment, each of the peripheral devices 106A and 106B is powered by a battery source, rather than through a network of the vehicle, in order to conserve energy provided by the vehicle (e.g., gasoline, electric power).

As shown in FIG. 1, the first peripheral device 106A is disposed on a driver-side side-view mirror 108A, and the second peripheral device 106B is disposed on a passenger-side side-view mirror 108B. However, it will be understood that the peripheral devices 106A and 106B may be disposed in other locations on the vehicle 102. For example, the first peripheral device 106A may be disposed on a driver-side door handle, and the second peripheral device 106B may be disposed on a passenger-side door handle. In an exemplary embodiment, the locations selected for the peripheral devices 106A and 106B are opposing locations (i.e., one location is on an opposing side of the vehicle 102 with respect to the other location).

The vehicle 102 also includes a computer processor 110, an application 112, and antenna 114. The computer processor 110 may be implemented using hardware, software, firmware, or a combination thereof. In an embodiment, the computer processor 110 may be part of the vehicle's body control module. The computer processor 110 executes the application 112 for implementing the exemplary device location and direction determination processes described herein. The application 112 may be stored in a storage device of the vehicle 102. The antenna 114 is communicatively coupled to the computer processor 110. The antenna 114 may be configured with similar properties as those described above with respect to the peripheral devices 106A and 106B. The antenna 114 sends and receives signals to and from the peripheral devices 106A and 106B using wireless low energy signals.

The computer processor 110, the application 112, and the antenna 114 are collectively referred to herein as a node 120.

The node 120 may be programmed with location information associated with the peripheral devices 106A and 106B with respect to the vehicle 102, as well as the antenna 114, which location information may be used to identify from which peripheral devices 106A and 106B and antenna 114 a signal is associated during processing of the signals.

The user interface device 104 is a portable device that may be carried by an individual. In an embodiment, the user interface device 104 is implemented as a key fob, smart phone, electronic identification card, or other device configured to communicate with the vehicle 102. The device 104 includes a computer processor 122, an antenna 124, and a storage device 126 communicatively coupled to the computer processor 122. The antenna 124 sends and receives radio frequency signals for communicating with the vehicle 102. In an embodiment, the antenna 124 of the device 104 and the antenna 114 of the vehicle 102 are configured to perform a pairing process (e.g., using Bluetooth® protocols) for authenticating the device 104 with the vehicle 102. When the pairing process is successful, the vehicle 102 is permitted to perform one or more remote functions (e.g., PEPS and/or RKE). For example, when the device 104 approaches the vehicle 102, the computer processor 110 may activate lighting on the vehicle 102 or unlock the driver-side door of the vehicle 102.

Figure 2:
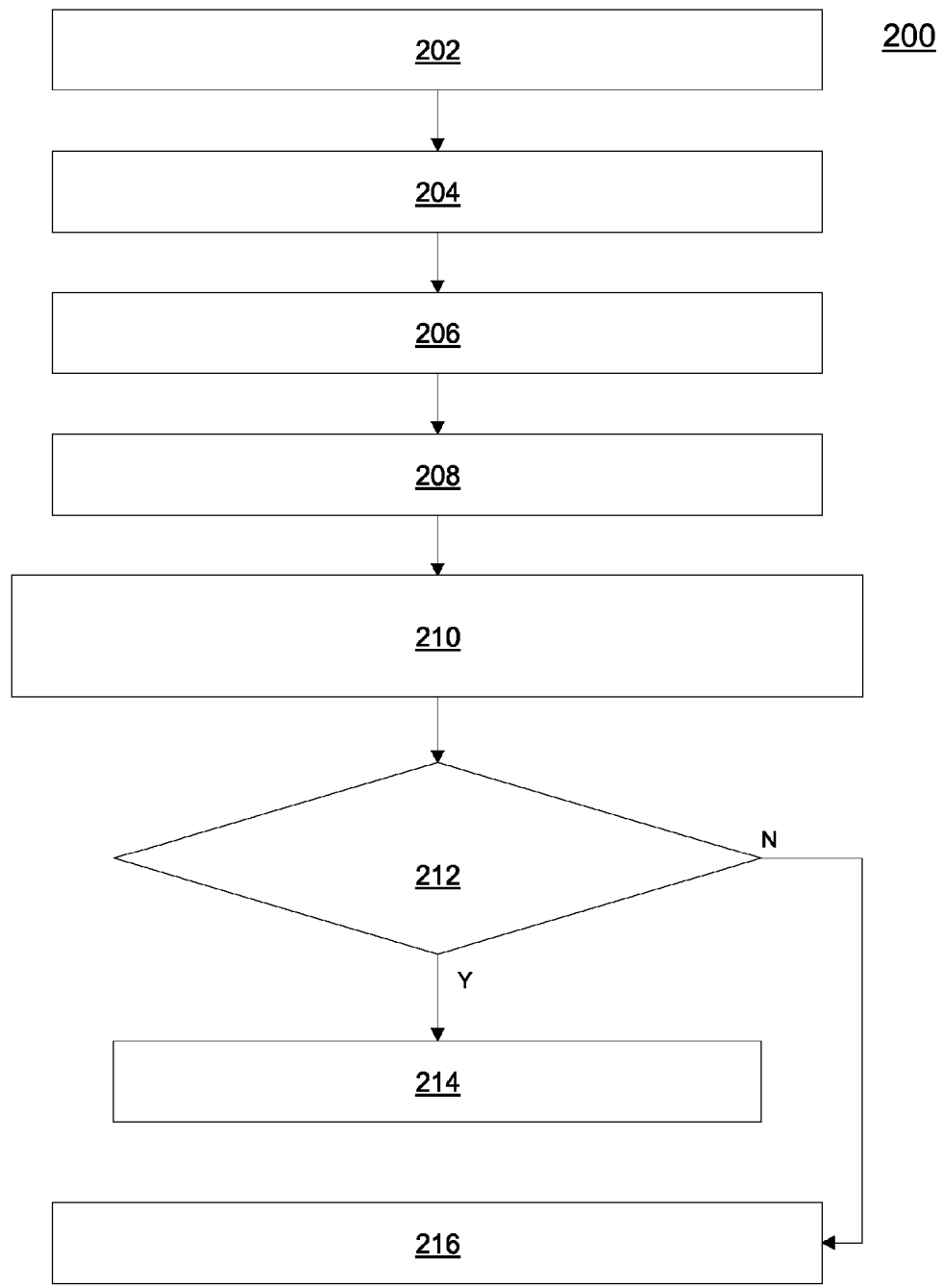
FIG. 2 is a flow diagram depicting an exemplary method for determining a location and direction of movement of a device by a vehicle.

Turning now to FIG. 2, a flow diagram 200 describing a process for implementing the device location determination features will now be described in an exemplary embodiment. The process of FIG. 2 assumes that the device 104 is in range of the vehicle 102.

At step 202, the node 120 of the vehicle 102 identifies the presence of the device 104 via the respective antennae 114 and 124. The node 120 and the device 104 maintain a wireless connection. This step may include an authentication process that authenticates the device 104 with the node 120.

At step 204, the device 104 scans for the presence of peripheral devices, such as peripheral devices 106A and 106B. For example, the device 104, through the antenna 124, listens for radio frequency signals transmitted by the peripheral devices 106A and 106B. The peripheral devices 106A and 106B may be configured to continuously emit these signals, which are captured by the device 104 at step 206. Additionally, at step 206, the device 104 receives signals from the antenna 114. Once the device 104 receives the signals from the peripheral devices 106A and 106B and the antenna 114, the computer processor 122 processes the signals to determine a received signal strength indicator (RSSI) value for the each of the peripheral devices 106A and 106B and the antenna 114 at step 208, and sends these RSSI values to the node 120. The RSSI reflects the strength of a signal being received by an antenna.

At step 210, the node 120 determines an approximate location of the device 104, as well as a direction of movement of the device 104, from the RSSI values. In an embodiment, the application 112 is configured to perform a triangulation algorithm on the RSSI values. For example, after a first processing scheme (e.g., processing of a first set of signals received from the peripheral devices 106A-106B and the antenna 114 that resulted in a first set of RSSI values), the device 104 is determined to be within a first distance of the vehicle 102 based on processed RSSI values. After a second processing scheme (e.g., processing of a second set of received signals emitted immediately following the first set of signals), the application 112 determines that the device 104 is at a second distance that is further away from the vehicle 102 than the first distance. In this example, the application 112 determines that the device 104 is moving away from the vehicle 102. By contrast, if the first set of RSSI values indicates a signal strength that is weaker than the second set of RSSI values, the application 112 may determine that the device 104 is moving toward the vehicle 102. In addition, the application 112 may determine location information from the RSSI signals. For example, if an RSSI value of the signal transmitted by the driver-side peripheral device (106A) is much stronger than an RSSI value of the signal transmitted by the passenger-side peripheral device (106B), the application 112 determines that the device 104 is approaching the driver-side door, and may perform a PEPS function specific to the driver side of the vehicle 102 (e.g., unlocking the driver-side door only).

The application 112 may be configured to associate a threshold value with the processed RSSI values in order to determine when to implement a PEPS function. For example, when the device 104 is determined to be within a specified distance of the vehicle and is moving closer to the vehicle 102, as determined from the triangulation algorithm and the signal strength of the RSSI values, the application 112 may activate the lights of the vehicle 102 and/or unlock one or more doors of the vehicle 102. By contrast, if the doors are unlocked and the RSSI values indicate the device 104 is moving away from the vehicle 102, the application 112 may be configured to lock the doors of the vehicle 102.

At step 212, the application 112 determines if the results of the algorithm meet the threshold value. For example, the threshold value may be indicative that the device 104 is moving toward the vehicle 102. If the results of the algorithm performed on the RSSI values meet the threshold value, the application 112 is configured to perform a first remote function (e.g., unlocking doors and activating lights) at step 214. If, however, the application 112 determines that the results do not meet the threshold value (e.g., the device 104 is moving away from the vehicle 102), the application 112 performs a second remote function (e.g., locking the doors) at step 216.

Technical effects of the invention include device location and direction of movement determinations by a vehicle for implementing remote functions, such as PEPS and/or RKE. The vehicle includes components that are used to collectively determine the location and direction of a user interface device (UID). Information collected from the components is processed, e.g., using a triangulation algorithm, and the results of the algorithm are used to determine an appropriate remote function.

As described above, the invention may be embodied in the form of computer implemented processes and apparatuses for practicing those processes. Embodiments of the invention may also be embodied in the form of computer program code containing instructions embodied in tangible media, such as floppy diskettes, CD-ROMs, hard drives, or any other computer readable storage medium, wherein, when the computer program code is loaded into and executed by a computer, the computer becomes an apparatus for practicing the invention. An embodiment of the invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed for carrying out this invention, but that the invention will include all embodiments falling within the scope of the present application.

What is claimed is:

1. A system, comprising:
   a node embedded in a vehicle, the node including a computer processor and an antenna;
   a first peripheral device disposed at a first location on the vehicle;
   a second peripheral device disposed at a second location on the vehicle that is different than the first location, the first peripheral device and the second peripheral device communicatively coupled to the node, and each of the first peripheral device and the second peripheral device includes an antenna;
   an application executable by the computer processor, the application configured to implement a method, the method including:
      authenticating a device within wireless communicative range of the vehicle;
      receiving, from the device, a first signal strength indicator value associated with a first signal transmitted by the first peripheral device, a second signal strength indicator value associated with a second signal transmitted by the second peripheral device, and a third signal strength indicator value associated with a third signal transmitted by the antenna of the node, each of the first, second, and third signal strength indicator values indicating a strength of respective first, second, and third signals;
      determining a location of the device from the first, second, and third signal strength indicator values using a triangulation algorithm; and
      performing a remote function with respect to the vehicle upon determining that results of the triangulation algorithm meet a threshold value.

2. The system of claim 1, wherein the application further implements:
   determining a direction of movement of the device from a comparison of successively calculated signal strength indicator values;
   wherein performing the remote function is based on a difference between the successively calculated signal strength indicator values.

3. The system of claim 1, wherein the first location is an opposing side of the vehicle with respect to the second location.

4. The system of claim 1, wherein the first location is a driver-side side-view mirror and the second location is a passenger-side side-view mirror.

5. The system of claim 1, wherein the first location is a driver-side door handle and the second location is a passenger-side door handle.

6. The system of claim 1, wherein the first peripheral device, the second peripheral device, and the node are configured to communicate using wireless low-energy communication protocols.

7. The system of claim 6, wherein the wireless low-energy communication protocols include Bluetooth low energy protocol.

8. The system of claim 1, wherein the first peripheral device and the second peripheral device communicate with the node over a wireless network.

9. The system of claim 1, wherein the remote function includes at least one of a passive entry passive start function and a remote keyless entry function.

10. A method, comprising:
authenticating, via a computer processor of a node embedded in a vehicle, a device within wireless communicative range of the vehicle, the vehicle including a first peripheral device disposed at a first location on the vehicle and a second peripheral device disposed at a second location on the vehicle that is different than the first location, the first peripheral device and the second peripheral device communicatively coupled to an antenna of the node;
receiving, from the device via an application executable by the computer processor, a first signal strength indicator value associated with a first signal transmitted by the first peripheral device, a second signal strength indicator value associated with a second signal transmitted by the second peripheral device, and a third signal strength indicator value associated with a third signal transmitted by the antenna of the node, the first, second, and third signal strength indicator values indicating a strength of respective first, second, and third signals;
determining a location of the device from the first, second, and third signal strength indicator values using a triangulation algorithm; and
performing a remote function with respect to the vehicle upon determining that results of the triangulation algorithm meet a threshold value.

11. The method of claim 10, further comprising:
determining a direction of movement of the device from a comparison of successively calculated signal strength indicator values;
wherein performing the remote function is based on a difference between the successively calculated signal strength indicator values.

12. The method of claim 10, wherein the first location is an opposing side of the vehicle with respect to the second location.

13. The method of claim 10, wherein the first location is a driver-side side-view mirror and the second location is a passenger-side side-view mirror.

14. The method of claim 10, wherein the first location is a driver-side door handle and the second location is a passenger-side door handle.

15. The method of claim 10, wherein the first peripheral device, the second peripheral device, and the node are configured to communicate using wireless low-energy communication protocols.

16. The method of claim 15, wherein the wireless low-energy communication protocols include Bluetooth low energy protocol.

17. The method of claim 10, wherein the first peripheral device and the second peripheral device communicate with the node over a wireless network.

18. A non-transitory computer program product comprising a computer-readable storage medium having instructions embodied thereon, which when executed by a computer processor embedded in a vehicle, causes the computer processor to implement a method, the method including:
authenticating a device within wireless communicative range of the vehicle, the vehicle including a first peripheral device disposed at a first location on the vehicle and a second peripheral device disposed at a second location on the vehicle that is different than the first location, the first peripheral device and the second peripheral device communicatively coupled to an antenna of a node in the vehicle;
receiving, from the device, a first signal strength indicator value associated with a first signal transmitted by the first peripheral device, a second signal strength indicator value associated with a second signal transmitted by the second peripheral device, and a third signal strength indicator value associated with a third signal transmitted by the antenna of the node, the first, second, and third signal strength indicator values indicating a strength of respective first, second, and third signals;
determining a location of the device from the first, second, and third signal strength indicator values using a triangulation algorithm; and
performing a remote function with respect to the vehicle upon determining that results of the triangulation algorithm meet a threshold value.

19. The computer program product of claim 18, wherein the method further includes:
determining a direction of movement of the device from a comparison of successively calculated signal strength indicator values;
wherein performing the remote function is based on a difference between the successively calculated signal strength indicator values.

20. The computer program product of claim 18, wherein:
the first location is an opposing side of the vehicle with respect to the second location; and
wherein the first location is a driver-side side-view mirror and the second location is a passenger-side side-view mirror.

* * * * *